(12) United States Patent
Yokota et al.

(10) Patent No.: US 7,446,507 B2
(45) Date of Patent: Nov. 4, 2008

(54) OVERCURRENT DETECTION METHOD AND DETECTION CIRCUIT

(75) Inventors: Kazushige Yokota, Ayase (JP); Eiji Tsuruta, Yamato (JP)

(73) Assignee: Nissan Motor Co., Ltd., Yokohama (JP)

( * ) Notice: Subject to any disclaimer, the term of this patent is extended or adjusted under 35 U.S.C. 154(b) by 326 days.

(21) Appl. No.: 11/229,838

(22) Filed: Sep. 20, 2005

(65) Prior Publication Data
US 2006/0066286 A1     Mar. 30, 2006

(30) Foreign Application Priority Data
Sep. 30, 2004   (JP)   ............... 2004-288432

(51) Int. Cl.
*H02H 3/00*     (2006.01)
*H02H 7/00*     (2006.01)
*H02H 9/02*     (2006.01)
*H02J 7/00*     (2006.01)

(52) U.S. Cl. ................. 320/136; 361/98; 361/100; 361/101; 320/134

(58) Field of Classification Search ........ 320/134, 320/136; 361/98, 100, 101
See application file for complete search history.

(56) References Cited
U.S. PATENT DOCUMENTS
5,559,500 A * 9/1996 Kase ................ 340/664
6,094,092 A    7/2000 Mizuno et al.
6,232,742 B1 * 5/2001 Wacknov et al. ........ 318/811

FOREIGN PATENT DOCUMENTS
JP         11-51983 A      2/1999
JP       2002-290222      10/2002
KR           0162847       4/1999

* cited by examiner

*Primary Examiner*—Akm E Ullah
*Assistant Examiner*—Jue Zhang
(74) *Attorney, Agent, or Firm*—Global IP Counselors, LLP

(57) ABSTRACT

In a load-driving apparatus with a FET between a battery and a load, an overcurrent detection circuit has a function generation circuit with a voltage divider circuit and a comparator. The voltage divider circuit has a pair of resistors connected to a drain of the FET, and a Zener diode connected to a connection point in parallel to the second resistor. The comparator compares a reference voltage at the connection point with a variable voltage of the FET, and outputs an overcurrent detection signal when the variable voltage becomes lower than the reference voltage. When no overcurrent exists and the battery voltage is not decreasing, the connection point is kept at a breakdown voltage of the Zener diode, and the difference with respect to the source voltage of the FET becomes particularly large. The comparator therefore does not erroneously output an overcurrent detection signal even when noise enters the system.

6 Claims, 2 Drawing Sheets

OVERCURRENT DETECTION METHOD AND DETECTION CIRCUIT

CROSS-REFERENCE TO RELATED APPLICATIONS

This application claims priority under 35 U.S.C. § 119 to Japanese Patent Application No. 2004-288432. The entire disclosure of Japanese Patent Application No. 2004-288432 is hereby incorporated herein by reference.

BACKGROUND OF THE INVENTION

1. Field of the Invention

The present invention relates to an overcurrent detection method and detection circuit for detecting an overcurrent in a circuit used to drive a load from a battery power source.

2. Background Information

In a load-driving apparatus for supplying electrical power from a battery to a load by a switch, such as for lighting a lamp in an automobile, there is a device designed to detect the occurrence of overcurrent and protect the load or electrical wiring.

An example of this overcurrent detection circuit for detecting an overcurrent is disclosed in Japanese Laid-Open Patent Publication No. 11-51983. This circuit is connected across a shunt resistor provided between the load and a field effect transistor (FET) switching semiconductor element. This circuit is designed so as to convert the current flowing through the shunt resistor into a voltage that is compared voltage with a reference voltage to if detect an overcurrent exists.

In view of the above, it will be apparent to those skilled in the art from this disclosure that there exists a need for an improved overcurrent detection method and detection circuit. This invention addresses this need in the art as well as other needs, which will become apparent to those skilled in the art from this disclosure.

SUMMARY OF THE INVENTION

It has been discovered that since a shunt resistor is used in the circuit disclosed in Japanese Laid-Open Patent Publication No. 11-51983, the problem of heat generated while current is flowing cannot be ignored. Since the detected voltage is low with respect to the current when the resistance value is decreased in order to minimize heat generated by the shunt resistor, it becomes more likely that an overcurrent would be mistakenly detected when outside noise occurs due to electromagnetic interference or the like entering the circuit.

In view of the foregoing drawbacks, one object of the present invention is to provide an overcurrent detection method and detection circuit capable of detecting an overcurrent with good precision without being affected by noise. This foregoing object can basically be attained by providing a method for detecting an overcurrent in a load-driving apparatus provided with a switching semiconductor element between a battery power source and a load. The method basically comprises detecting a variable value corresponding to current flowing through the switching semiconductor element; setting a reference value as a function of battery voltage of the battery power source so that an overcurrent detection current value for indicating an overcurrent condition increases as an amount of reduction in the battery voltage of the battery power source becomes smaller; comparing the variable value corresponding to the current flowing through the switching semiconductor element with the reference value; and determining the overcurrent condition exist when the variable value reaches the reference value.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
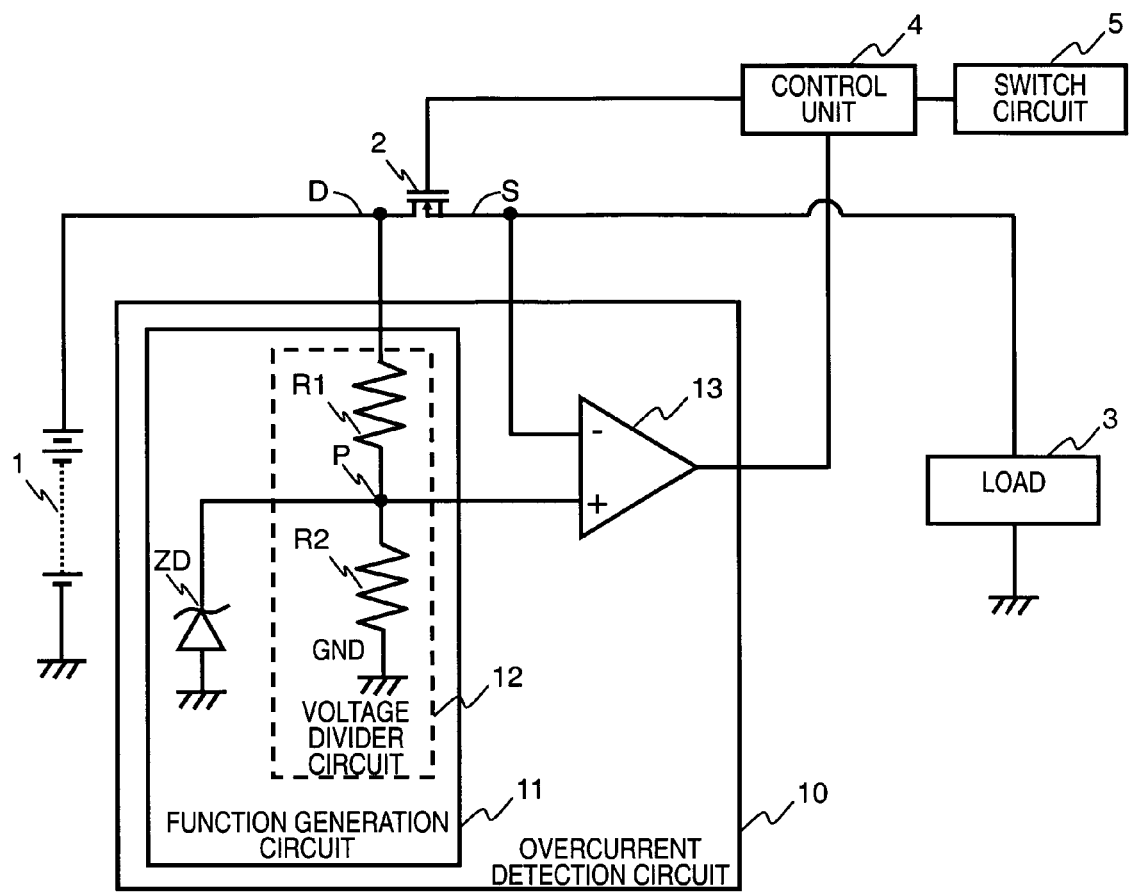
FIG. 1 is a block diagram showing a load-driving apparatus provided with an overcurrent detection circuit in accordance with one embodiment of the present invention.

Referring initially to FIG. 1, a basic structure of a load-driving apparatus is illustrated that is provided with an overcurrent detection circuit in accordance with a first embodiment of the present invention. The load-driving apparatus has a battery 1 with a field effect transistor (FET) 2 provided between the battery 1 and a load 3 such a lamp or other electrical device. The load-driving apparatus also has a control unit 4 and a switch circuit 5. The control unit 4 is connected to a gate of the FET 2. The switch circuit 5 is connected to the control unit 4. The control unit 4 is configured to switch the FET 2 on or off based on a command from the switch circuit 5. The FET 2 has a drain (D) is connected to the battery 1, and a source (S) is connected to the load 3. Thus, the FET 2, the control unit 4 and the switch circuit 5 form a switching semiconductor element having current flowing therethrough from the battery 1 to the load 3.

An overcurrent detection circuit 10 is attached to the FET 2. The overcurrent detection circuit 10 includes a function generator circuit 11 with a voltage divider circuit 12 and a comparator 13. The voltage divider circuit 12 basically includes a pair of resistors R1 and R2 provided in series between the drain (D) of the FET 2 and the ground GND. The function generator circuit or component 11 has a Zener diode ZD provided between the ground GND and a connection point P between the resistors R1 and R2.

A breakdown voltage of the Zener diode ZD is set to be lower than the voltage at the connection point P between the resistors R1 and R2 when the rated voltage of the battery 1 is applied to the drain (D) of the FET 2. Specifically, for example, if the rated voltage of the battery 1 is assumed to be 12 V, then the resistance value of the resistor R1 is assumed to be 3 kΩ, the resistance value of the resistor R2 is assumed to be 27 kΩ, and the breakdown voltage of the Zener diode ZD is assumed to be 6.8 V.

The connection point P between the resistors R1 and R2 is connected to the non-inverted input terminal (the "plus" terminal or the positive terminal) of the comparator 13, so that the voltage of the connection point P is inputted to the comparator 13 as the output of the function generator circuit 11. The inverted input terminal (the "minus" terminal or the negative terminal) of the comparator 13 is connected to the source (S) of the FET 2. The output terminal of the comparator 13 is connected to the control unit 4.

Figure 2:
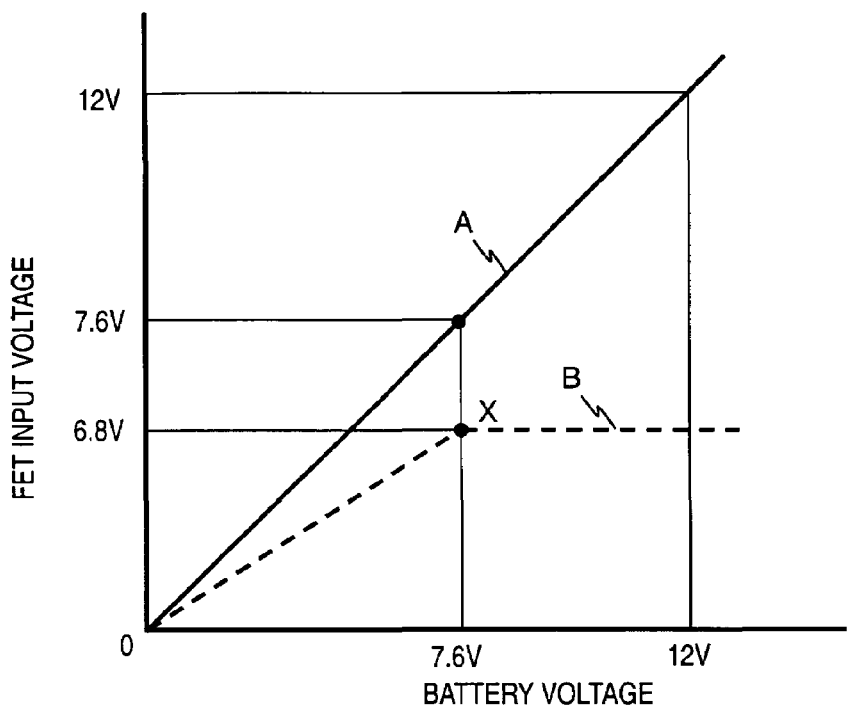
FIG. 2 is a diagram showing the input state of the comparator with respect to the battery voltage when no overcurrent is flowing.

FIG. 2 shows the input state of the comparator 13 when no overcurrent is flowing to the FET 2, i.e., when no overcurrent condition exist. Since the voltage decrease of the battery 1 is small when no overcurrent is flowing, the input voltage to the FET 2 becomes as indicated by the straight line A with respect to the battery voltage. The source potential of the FET 2 is also the same as the input voltage at this time. The voltage of this straight line A is applied as a variable value to the inverted input terminal of the comparator 13 that is connected to the source (S).

The output of the function generator circuit 11 inputted to the non-inverted input terminal of the comparator 13 is shifted with respect to the straight line A by a voltage based on the voltage division ratio of the resistors R1 and R2, but is held at 6.8 V after reaching the 6.8 V breakdown voltage of the Zener diode ZD. The conversion point of the battery voltage is 7.6 V when this constant voltage of 6.8 V is reached according to the equation below.

$$6.8 \times (3+27)/27 = 7.6 \text{ (V)}$$

The output of the function generator circuit 11 indicated by this broken line B becomes the reference voltage (prescribed reference value) for detecting if an overcurrent condition exists. When an overcurrent is not flowing, the straight line A is higher than the reference voltage (B), and the output signal of the comparator 13 is L (low) to indicate a non-overcurrent condition.

When an overcurrent condition exists, the overcurrent reduces the voltage of the battery 1, such that a voltage drop is brought about between the drain (D) and the source (S) of the FET 2 as well by the on-state resistance. Thus, the comparator 13 then outputs H (high) as the overcurrent detection signal when the source voltage inputted to the inverted input terminal becomes lower than the reference voltage inputted to the non-inverted input terminal.

When the overcurrent detection signal is outputted from the comparator 13, the control unit 4 turns the FET 2 off to prevent an overcurrent from flowing to the load 3.

Figure 3:
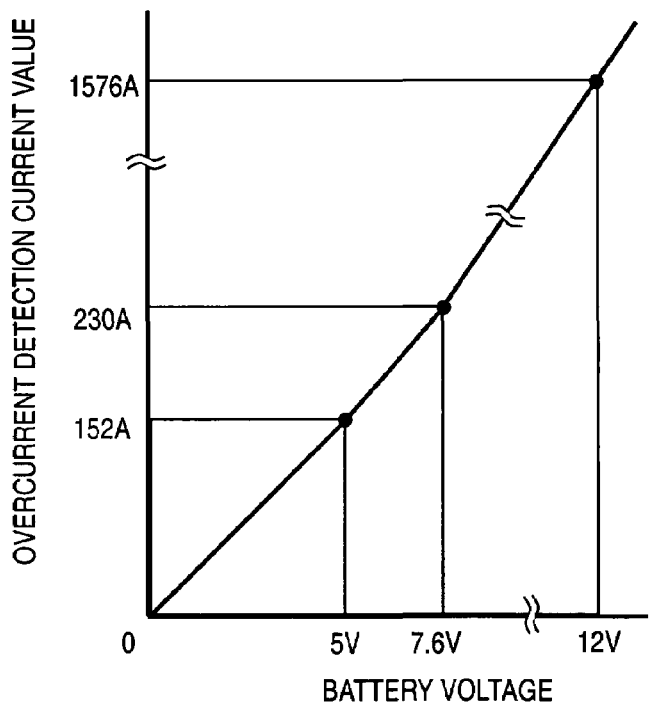
FIG. 3 is a diagram showing the overcurrent detection current value with respect to the battery voltage.

As described above, if it is assumed that the resistance value of the resistor R1 is 3 k$\Omega$, the resistance value of the resistor R2 is 27 k$\Omega$, the breakdown voltage of the Zener diode ZD is 6.8 V, and the on-state resistance of the FET 2 is 3.3 m$\Omega$, then the overcurrent detection current (the current value when the output of the comparator 13 is H) with respect to the battery voltage assumes the form shown in FIG. 3.

Specifically, in a state in which an overcurrent condition exists and the battery voltage decreases to 5 V, the overcurrent detection current is 152 A. In other words, if a current of 152 A is flowing through the FET 2 or the load 3, this current is determined to be an overcurrent, and an overcurrent detection signal is outputted.

In a state in which there is no voltage decrease in the battery 1 due to there being no actual overcurrent condition existing, and the battery voltage is 12 V, the overcurrent detection current is 1576 A as shown by the calculation below.

$$(12-6.8) \text{V}/3.3 \text{ m}\Omega = 1576 \text{ A}$$

Specifically, when no overcurrent condition exists, there is no overcurrent detection signal being outputted from the comparator 13 since no extremely large current is flowing.

In the embodiment described above, the load-driving apparatus is provided with the FET 2 between the battery 1 and the load 3 with the function generator circuit 11 being connected to the battery side of the FET 2 for outputting a prescribed reference voltage as a function with respect to the battery voltage. The load-driving apparatus uses the comparator 13 for outputting an overcurrent detection signal when the source voltage of the FET 2 decreases to the reference voltage (i.e., when an overcurrent condition exists). This reference voltage is set so that the overcurrent detection value for indicating an overcurrent condition increases as an amount of reduction in the battery voltage of the battery power source becomes smaller. Thus, the difference between the reference voltage and the source or load side voltage of the FET 2 increases to the extent that the battery voltage becomes so high that an overcurrent does not occur. As a result, it is difficult for the abovementioned difference to be bridged even when noise enters the system, and the comparator 13 is prevented from erroneously outputting an overcurrent detection signal.

Since the function generator circuit 11 has the voltage divider circuit 12 with the resistor R2 connected in series with the resistor R1, which is itself connected to the battery 1 side of the FET 2, and the connection point P of the resistors R1 and R2 is connected to the non-inverted input terminal of the comparator 13, the reference voltage shifts by a voltage based on the voltage division ratio of the resistors R1 and R2 with respect to the battery voltage. In this simple structure, the difference between the source voltage and the reference voltage increases with increased battery voltage, and the overcurrent detection current value can be increased.

In the function generator circuit 11, the Zener diode ZD is provided in parallel with the resistor R2, with the cathode of the Zener diode ZD being connected to the connection point P between the resistors R1 and R2. The connection point P is kept at the breakdown voltage of the Zener diode ZD by the breakdown of the Zener diode ZD when the battery voltage is at or above a prescribed value, and the difference with respect to the source voltage of the FET 2 therefore becomes particularly large. Consequently, an overcurrent detection signal is even more reliably prevented from being erroneously outputted in a state in which there is no overcurrent flowing.

The resistance values of the resistors, the breakdown voltage of the Zener diode, the on-state resistance of the FET, the rated voltage of the battery, and other values in the embodiment described above are intended as examples and do not limit the present invention, and may be set to any value as needed and/or desired.

As used herein to describe the above embodiment, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A method for detecting an overcurrent in a load-driving apparatus provided with a switching semiconductor element between a battery power source and a load, comprising:
   detecting a variable value corresponding to current flowing through the switching semiconductor element;
   setting a reference value as a function of battery voltage of the battery power source so that an overcurrent detection current value for indicating an overcurrent condition increases as an amount of reduction in the battery voltage of the battery power source becomes smaller;
   comparing the variable value corresponding to the current flowing through the switching semiconductor element with the reference value; and
   determining the overcurrent condition exists and switching off the switching semiconductor element to prevent an overcurrent from flowing to the load in response to the variable value becoming lower than the reference value.

2. The method according to claim 1, wherein
   the setting of the reference value function further includes maintaining the reference value constant when the battery voltage of the battery power source is at or above a prescribed value.

3. An overcurrent detection circuit for detecting an overcurrent in a load-driving apparatus provided with a switching semiconductor element between a battery power source and a load, comprising:
   a function generation component configured to output a reference voltage as a function with respect to battery voltage of the battery power source, the function generation component being configured to be connected to a battery power source side of the switching semiconductor element; and
   a comparator having a non-inverted input terminal operatively coupled to the function generation component to receive the reference voltage, an inverted input terminal configured to be operatively coupled to a load side of the switching semiconductor element to receive a load side voltage of the load side of the switching semiconductor element, and an output terminal configured to output an overcurrent detection signal to switch off the switching semiconductor element to prevent an overcurrent from flowing to the load in response to the load side voltage of the load side of the switching semiconductor element becoming lower than the reference voltage,
   the reference voltage being set by the function generation component so that the overcurrent detection current value for indicating an overcurrent condition increases as an amount of reduction in the battery voltage of the battery power source becomes smaller.

4. The overcurrent detection circuit according to claim 3, wherein
   the function generation component includes a voltage divider circuit having a first resistor connected to the battery power source side of the switching semiconductor element, and a second resistor connected in series to the first resistor; and
   the non-inverted input terminal of the comparator is connected at a connection point between the first and second resistors.

5. The overcurrent detection circuit according to claim 4, wherein
   the function generation component further includes a Zener diode connected in parallel with the second resistor with a cathode of the Zener diode being connected to the connection point between the first and second resistors, such that voltage of the connection point between the first and second resistors is maintained constant when the voltage of the battery power source is at or above a prescribed value.

6. An overcurrent detection circuit for detecting an overcurrent in a load-driving apparatus provided with a switching semiconductor element between a battery power source and a load, comprising:
   means for generating a reference value as a function with respect to voltage of the battery power source so that an overcurrent detection current value for indicating an overcurrent condition increases as an amount of reduction in a battery voltage of the battery power source becomes smaller
   means for comparing a variable value corresponding to current flowing through the switching semiconductor element with the reference value; and
   means for determining the overcurrent condition exists and switching off the switching semiconductor element to prevent an overcurrent from flowing to the load in response to the variable value becoming lower than the reference value.

* * * * *